United States Patent [19]
Yamane et al.

[11] Patent Number: 4,720,772
[45] Date of Patent: Jan. 19, 1988

[54] FUSED SOLID ELECTROLYTIC CAPACITOR

[75] Inventors: Masayuki Yamane; Keiji Iijima; Kenji Mochizuki, all of Tokyo, Japan

[73] Assignee: NEC Corporation, Japan

[21] Appl. No.: 11,541

[22] Filed: Feb. 6, 1987

[30] Foreign Application Priority Data

Feb. 7, 1986 [JP] Japan .............................. 61-17072[U]

[51] Int. Cl.$^4$ .......................... H01G 9/00; B01J 17/00
[52] U.S. Cl. ..................................... 361/433; 361/275
[58] Field of Search ............... 361/272, 274, 275, 306, 361/433, 402, 404

[56] References Cited

U.S. PATENT DOCUMENTS

| | | | |
|---|---|---|---|
| 4,027,207 | 5/1977 | Parsons | 361/404 |
| 4,224,656 | 9/1980 | De Matos et al. | 361/433 |

Primary Examiner—Donald A. Griffin
Attorney, Agent, or Firm—Laff, Whitesel, Conte & Saret

[57] ABSTRACT

In a fused solid electrolytic capacitor wherein one terminal of a solid electrolytic capacitor is connected to an external lead through the intermediary of a fusing arrangement, the fusing arrangement is featured in that two conductive layers are formed on the same plane of an insulating base plate and connected electrically in series by a fuse element stretched in parallel to the plane, and in that the periphery of the fuse element is covered with a heat insulative elastic substance such as silicone resin.

11 Claims, 9 Drawing Figures

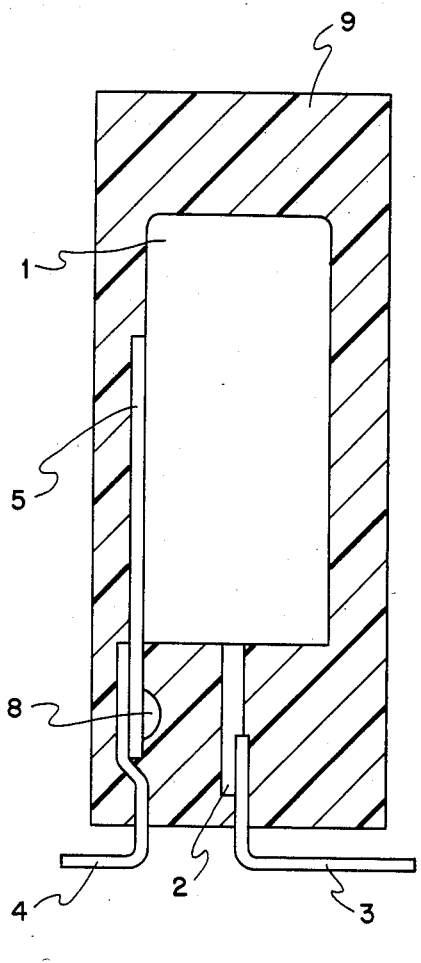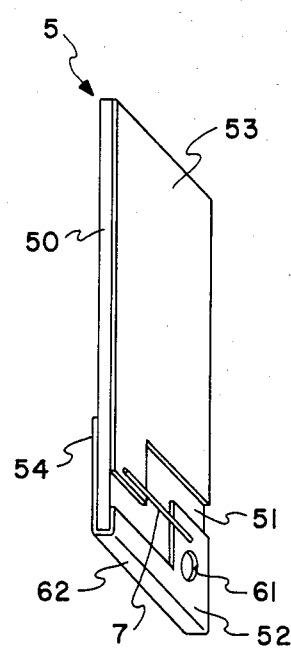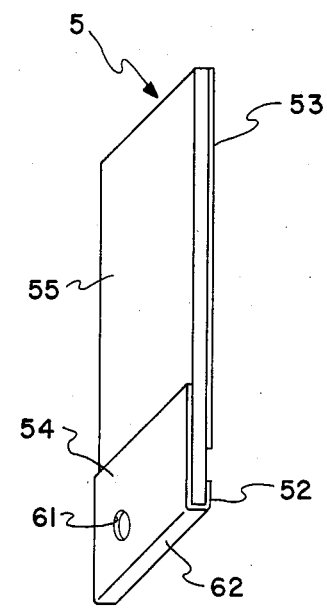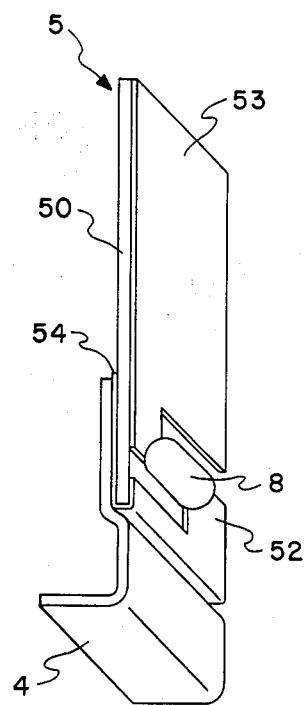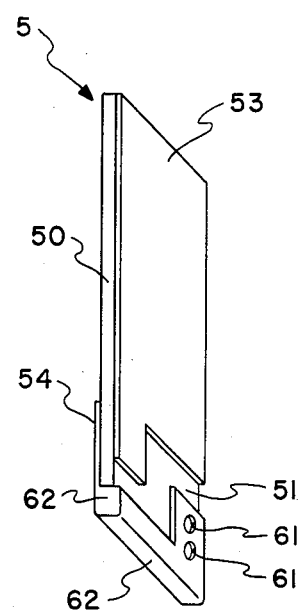
FIG. 1
FIG. 2A
FIG. 2B
FIG. 3
FIG. 4

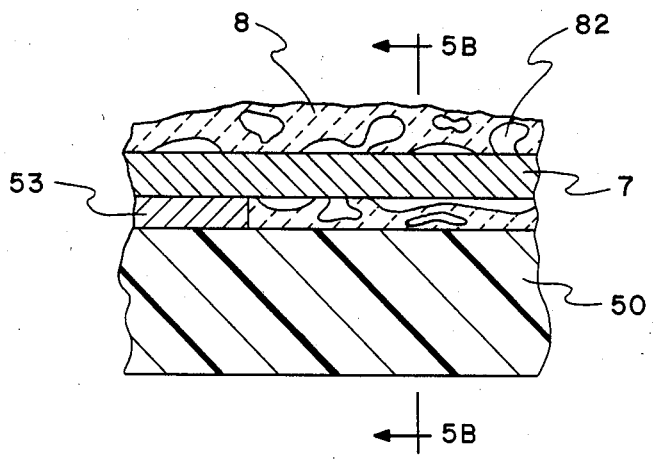
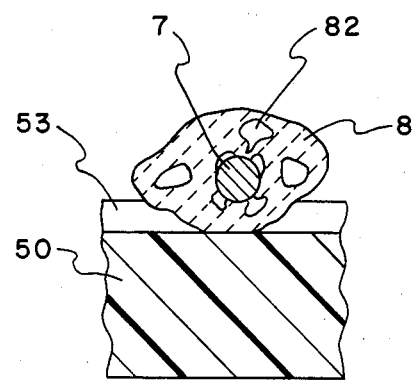
FIG. 5A  FIG. 5B
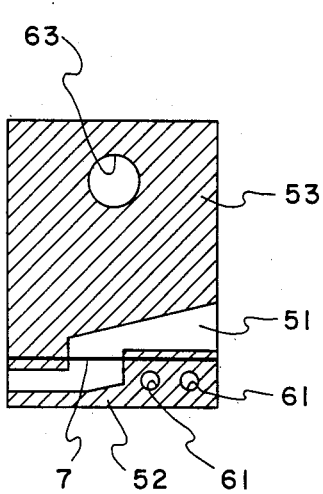
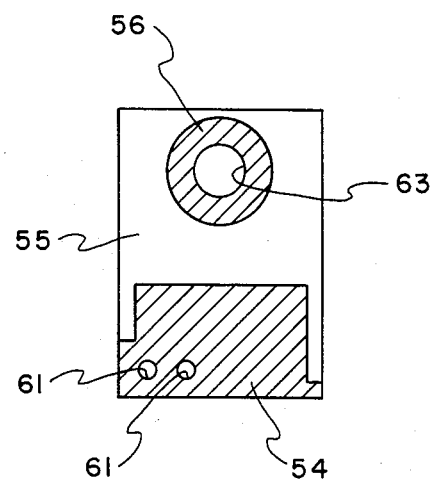
FIG. 6A  FIG. 6B

4,720,772

FUSED SOLID ELECTROLYTIC CAPACITOR

BACKGROUND OF THE INVENTION

The present invention relates to a fused solid electrolytic capacitor, and particularly to a fusing arrangement thereof.

Solid electrolytic capacitors are used generally in various electronic circuits, and a fault rate thereof is small. The fault thereof, if it should occur, is often in a mode of short circuit, and when a large short-circuit current flows, a capacitor element is heated and sometimes caused to burn. For protecting circuit components from this excessive short-circuit current, a fuse is sometimes incorporated into a solid electrolytic capacitor. As for prior art, there is such a solid electrolytic capacitor with a fuse incorporated therein as disclosed in U.S. Pat. No. 4,224,656 issued on Sept. 23, 1980.

The fusing arrangement in this prior art has a fundamental structure wherein a cavity to house a fuse element therein is formed in an insulating body having copper laminated surfaces and both ends of the fuse element placed in the cavity is connected to the copper laminates on both sides. A lead is soldered to the copper laminate on one side at its one end and is connected to the cathode layer of a capacitor body at its other end. Another lead is soldered to the other side and lead out externally as an external lead. The fuse element is hermetically sealed in the cavity by the two leads soldered so as to close the openings of the cavity.

The structure of such a fusing arrangement as described above causes a manufacturing trouble of passing the fuse element through the cavity, thus obstructing mass-productivity.

Moreover, on the occasion when the two leads are soldered to the copper laminates to cover the openings of the cavity, solder happens to fill the cavity, causing a failure of spoiling the fusing effect.

Furthermore, slackening or distortion of a fuse element, if any, varies the effective length thereof, which cause a failure of nonuniformity in the fusing current characteristics of the fuse element.

SUMMARY OF THE INVENTION

Accordingly, an object of the present invention is to provide a solid electrolytic capacitor in which a fusing arrangement having high mass-productivity and being easy to assemble is incorporated.

The present invention is featured in that the opposite ends of a fuse element are connected respectively to conductive layers which are formed on the same surface of an insulating plate. The fuse element bridging the two conductive layers is located between these conductive layers so that it is spaced from the insulating surface of the insulating plate. One of the conductive layers is elongated on the same surface of the insulating plate and connected to one terminal of a capacitor body having two terminals. The other of the conductive layers is electrically connected to a conductive layer which is formed on the back surface of the insulating plate and to which an external lead is electrically connected. Another external lead is connected to the other terminal of the capacitor body. Thus, capacity body are connected in series electrically between the two external leads.

According to another feature of the present invention, there is provided a fused capacitor assembly comprising a solid electrolytic capacitor body having first and second terminals, a heat insulative plate having a first conductor layer and a second conductor layer provided on the same surface thereof, the second conductor layer being separated from the first conductor layer by an insulating space, a fuse element connected between the first conductor layer and the second conductor layer such that the fuse element crosses through the insulating space with a gap between the fuse element and the surface of the insulative plate, a heat insulative, elastic resin provided on the surface of the insulative plate to cover at least such portion of the fuse element that is positioned in the insulating space with partial spaces between the fuse element and the elastic resin, means for electrically connecting the first conductor layer to the first terminal of the capacitor body, a first external lead electrically connected to the second conductor layer, a second external lead connected to the second terminal and an encapsulation material coating the capacitor body, the insulative plate provided with the first and second conductor layers, and the fuse element protected by the elastic resin. The elastic resin favorably contains numerous voids or bubbles to enhance the fusing effect.

BRIEF DESCRIPTION OF THE DRAWINGS

FIG. 1 is a cross-sectional view of a fused solid electrolytic capacitor based on one embodiment of the present invention;

FIG. 2A is a perspective view of the front side of a double-sided printed wiring board in FIG. 1;

FIG. 2B is a perspective view of the back side of the board in FIG. 2A;

FIG. 3 is a perspective view of the front side of the double-sided printed wiring board shown in FIG. 1 and that of a cathode external lead;

FIG. 4 is a perspective view of the front side of a double-sided printed wiring board according to another embodiment of the present invention;

FIG. 5A is an enlarged sectional view of a fuse element covered with cellular elastic resin;

FIG. 5B is view of a section taken along a line A—A in FIG. 5A;

FIG. 6A is a front view of the front side of a double-sided printed wiring board according to a still another embodiment of the present invention; and FIG. 6B is a back view of the board of FIG. 6A.

DETAILED DESCRIPTION OF THE PREFERRED EMBODIMENTS

Referring to FIG. 1, an anode body of a valve metal such as tantalum is subjected to anodic oxidation and a manganese dioxide layer, a carbon layer and a silver paste layer are connected thereon sequentially. As a result, a solid electrolytic capacitor body 1 having a cathode portion in the outer-most layer is formed. An anode terminal 2 embedded in this capacitor body 1 and a rectangular-plate-shaped anode external lead 3 are connected together by means of welding or the like. A cathode external lead 4 having a stepped section is connected by soldering or the like to a double-sided printed wiring board 5 with a fuse attached thereto, which will be described later. The double-sided printing wiring board 5 is connected by soldering or the like to the cathode portion of the capacitor body 1. The assembly is thereafter encapsulated with an electrically insulating material 9 such as epoxy resin by means of transfer molding, dipping or the like. Then, the anode and cathode external leads 3 and 4 are bent outwardly to have an L-shaped section respectively, thus a fused solid electrolytic capacitor being formed.

Referring to FIGS. 2 and 3, the structure and manufacturing process of the double-sided printed wiring board 5 with a fuse attached will be described.

As is shown in FIG. 2, an insulative base plate 50 made of a glass-epoxy material or the like has conductive layers such as copper laminates on the front and back surfaces. A through hole 61, for instance, is provided, by a boring tool such as a drill, in the base plate 50 and thereafter copper plating is applied to form a conductive layer inside the hole as well as on the copper laminates and thereby to provide a through-hole 61 connecting electrically the conductive layers on the both sides of the plate 50. Moreover, the plating is applied also on one end face of this base plate 50 to form a conductive layer 62 and thereby to secure further the electric continuity between the conductive layers 52 and 54 of the front and back surfaces.

Next, the conductive layer on one side (on the front surface) of the base plate 50 is selectively removed by etching to leave two regions 52 and 53 electrically separated by a crank-shaped insulating space 51 on the insulating surface of the base plate 50. The region 53 extends over the wide surface of the plate 50 and the cathode portion of the capacitor 1 is to be connected thereto. On the other side (the back surface) of the base plate 50, the conductive layer is selectively removed to leave the conductive region 54 expanding around the through-hole 61 and connected through the conductive layer 62 to the region 52 of the front side. The cathode external lead 4 is to be connected to this region 54. In this way, the double-sided printed wiring board 5 is formed. Next, a fuse element 7 is stretched between two separated conductive regions 52 and 53 on the front side of the double-sided printing wiring board 5, and the opposite ends of the fuse 7 are connected to the conductive regions 52 and 53 respectively by means of soldering or the like. This simple arrangement of the fuse 7 on the printed wiring board facilitates mass-producitivity. As the fuse 7, a known aluminum fine wire having its outer peripheral surface covered with palladium, copper or the like, or a solder fine wire of lead 93.5%, tin 5% and silver 1.5%, or a solder fine wire of lead 97.5% and silver 2.5%, can be used.

In a preferred embodiment, furthermore, as shown in FIG. 3, the fuse 7 bridging the insulating space 51 is coated with a heat insulative elastic resin 8 (hereinafter called elastic resin), such as silicone resin, which is easily deformed and not sticky, so that the whole of the fuse 7 or at least the part thereof positioned in the insulating space 51 is covered with the resin 8, and then it is dried at a temperature of about 80° to 200° C. By this heat treatment, partial spaces are formed between the surface of the fuse 7 and the elastic resion 8 due to the heat deformation of the resin 8.

In the foregoing embodiment, although the double-sided printed wiring board 5 is used, the cathode external lead 4 may be connected to the conductor layer 52 by using single-sided printed wiring board.

Even the single-sided printed wiring board 5 facilitates the firm fitting of the fuse 7 in a uniform length on the surface by such simple means as soldering, and enables the mass-producitivity.

In a preferred embodiment, the conductor layer 54 of the double-sided printed wiring board 5 and the cathode external lead 4 are connected together surely in a wide area, and the provision of the through-hole 61 and the end-face conductor layer 62 ensures firm connection of the opposite surfaces of the printed wiring board, which enables the attainment of a wide connection area. In addition, since a bonding material such as solder extends from the conductor layer 54 to the conductor layer 52 via not only the through hole 61 but also the conductor layer 62 on edge portion, connection strength between cathode external lead 4 and the conductor layer 54 is increased.

The elastic resin 8 prevents a heat from dissipating to the surroundings when an overcurrent flowing through the fuse 7 generates the heat therefrom, and protects the fuse 7 from a shock given when encapsulation resin 9 is injected in the coarse of a subsequent molding process.

In the preferred embodiment, the fuse 7 is melted away by a relatively low current owing to the heat-insulating effect of the partial spaces between elastic resin 9 and the fuse 7. The melted fuse 7 is divided into ball-shaped substances by a force of surface tension and absorbed rapidly by the spaces expanded with a change in the form of the elastic resin 8, thus the fuse 7 being so melted away as to make sure of electric disconnection. Accordingly, the use of the elastic resin 8 is favorable in promoting the melting of the fuse 7.

To further ensure the fuse 7 to be melted away, numerous small bubbles 83 may be contained within the elastic resion 8 as shown in FIG. 5A and FIG. 5B. Since the number of partial spaces 82 between the resin 8 and the fuse 7 is increased due to the bubbles, the heat-insulating effect of the elastic resin 8 is increased to further promote melting of the fuse 7. In the case of using silicone for the elastic resin 7, it is convenient to use an ordinary silicone resin which usually contains bubbles, without subjecting it to the bubble-removing process.

While a wire material is mentioned for the fuse 7 in the above-described embodiment, either a thin-plate material, or a leaf prepared by evaporation or the like may also be used therefor. As for means of connecting the fuse 7 with the printed wiring board 5, other means, such as welding or wire bonding, may be employed as well other than soldering employed herein. In addition, while silicone resin 8 is applied on the fuse 7 in the above description, other materials, e.g., butadiene rubber-like resin, may be used therefore, of course, on condition that they have elasticity to be easily deformed and heat-insulating properties.

It is also a matter of course that the respective number of the through-hole 61 and the conductor layer 62 on the end face is not limited to one, but a plurality of them may also be provided as shown in FIG. 4.

Another embodiment is shown in FIG. 6. The characteristic feature of this embodiment is in that a large through-hole 63 is provided in the region of the conductive layer 53 and that a conductive land portion 56 connected to this through-hole 63 is provided on the back surface 55 of the base plate, for the purpose of increasing the strength of connection of the double-sided printed wiring board with the capacitor 1. Owing to this construction, solder gets into the throug-hole 63 and reaches the land portion 56 on the occasion of soldering with the cathode layer of the capacitor 1 for connection, whereby the strength of connection is increased to a large extent. On the other hand, two through-holes 61 are formed in the conductive layers 52 and 54. Thereby the continuity of the two sides is attained, while solder is thereby made to rise into the through-holes 61 to consolidate the connection on the occasion of soldering with the cathode external lead 4. In the same way as in the embodiment of FIG. 2, a plating layer is formed also on the lower-side end face of the base plate, whereby the connection strength can be improved further.

The fuse 7 extends in this embodiment across the entire width of the double-sided printed wiring board, as shown in FIG. 6A. An example of dimensions in the embodiment of FIG. 6 is as follows: the base plate 50 is 3.8 mm wide, 5 mm long and 0.2 mm thick, and the diameter of the through-hole 63 is 1.0 mm, while the outside diameter of the land portion 56 is 2.0 mm. The diameter of the through-hole 61 is 0.4 mm. The effective length of the fuse 7, i.e., the distance covered by the fuse traversing the insulating-separating region 51, is set to be 0.95 mm, while the diameter of the fuse 7 is 50 $\mu$m. By setting the thickness of the conductive layers 52 and 53 to be 18 $\mu$m, the fuse 7 is spaced apart from the exposed surface of the base plate by a gap of 18 $\mu$m. The diameter of the bubble containe 6 in the silicone resin is preferably about 20 to 80 $\mu$m.

The present invention described above has the following effects.

(i) The number of processes for connection is reduced, and the area of connected portions is widened, thus the reliability of connection being improved.

(ii) The structure of the fusing arrangement is simplified, since it is unnecessary to provide a cavity housing the fuse.

(iii) The reliability of fusing is improved, since the size of the fuse is made uniform.

(iv) The protection of a fuse from encapsulation resion is facilitated, when the fuse is covered with elastic resin which promotes the melting thereof.

What is claimed is:

1. A fused capacitor assembly comprising:
a solid electrolytic capacitor body having first and second terminals;
a heat insulative plate having a first conductor layer provided on a first principal surface thereof, said first conductor layer being connected to said first terminal, a second conductor layer provided on said first principal surface of said insulative plate, said second conductor layer being separated from said first conductor layer by an insulating space, and a third conductor layer provided on a second principal surface of said insulative plate, said third conductor layer being electrically connected to said second conductor layer;
a fuse element connected between said first conductor layer and said second conductor layer such that said fuse element crosses over said insulating space to provide a gap between said fuse element and said first principal surface of said insulative plate;
a heat insulative elastic resin coating at least the portion of said fuse element positioned at said insulating space with partial spaces between said fuse element and said elastic resin;
a first external lead connected to said third conductor layer;
a second external lead connected to said second terminal;
an insulating material encapsulating said capacitor body, said insulative plate provided with said first, second and third conductor layers, and said fuse element protected by said elastic resin.

2. A fused capacitor assembly as claimed in claim 1, wherein said elastic resin contains numerous small bubbles.

3. A fused solid electrolytic capacitor comprising:
a solid electrolytic capacitor element having two terminals, a first external lead connected to one of said two terminals, an insulating base plate having on one main surface a first conductive layer and a second conductive layer formed on said one main surface and separated electrically from said first conductive layer by an insulating space on an exposed region of said insulating base plate, a fuse element electrically connecting said first conductive layer and said second conductive layer and disposed to cross over said insulating space such that said fuse element is separated from the exposed region of said insulating base plate to form a gap therebetween, insulative elastic body covering at least a portion of said fuse element positioned on said insulating space, means for electrically connecting the other of said two terminals to said first conductive layer, and a second external lead electrically connected to said second conductive layer.

4. A fused solid electrolytic capacitor claimed in claim 3, wherein a third conductive layer connected electrically to said second conductive layer through at least one first through-hole provided in the aforesaid insulating base plate is formed on a main surface opposite to said one main surface of the insulating base plate, and said second external lead is attached to said third conductive layer.

5. A fused solid electrolytic capacitor claimed in claim 4, wherein a plurality of said first through-holes are provided and moreover a fourth conductive layer is formed on an end face of said insulating base plate so as to make said second and third conductive layers continuous electrically.

6. A fused solid electrolytic capacitor claimed in claim 4, wherein a fourth conductive layer connected electrically to said first conductive layer through a second through-hole provided in the aforesaid insulating base plate is formed on the main surface opposite to said one main surface of the insulating base plate.

7. A fused solid electrolytic capacitor claimed in claim 3, further comprising an insulating material encapsulating said capacitor element and the insulating base plate.

8. A fused capacitor assembly including a solid electrolytic capacitor body having two terminals, two external leads, one of said leads being connected to one of said terminals, a heat insulative plate having a front and a back surfaces, a first conductor layer provided on said front surface and connected to the other of said two terminals, a second conductor layer provided on said front surface, said second conductor layer being separated from said first conductor layer by an insulating space, a fuse element provided ons aid heat insulative plate in parallel with said front surface and electrically connected to said first and second conductor layers such that said fuse element crosses over said insulating space to provide a gap between said fuse element and said front surface, and a heat insulative material provided on said fuse element, and a rigid insulative material encapsulating said capacitor body, said plate and said fuse element.

9. A fused capacitor assembly as claimed in claim 8, wherein said heat insulative material consists of elastic resin and partial spaces are provided between said fuse element and said heat insulative material.

10. A fused capacitor assembly as claimed in claim 9, wherein said elastic resin is silicone resin containing numerous bubbles.

11. A fused capacitor assembly including a solid electrolytic capacitor body having two terminals, two external leads, a heat insulative plate having a first conductor layer provided on a first principal surface thereof, said heat insulative plate being attached to said capacitor body with said first conductor layer being connected to one of said two terminals of said capacitor body, a second conductor layer provided on said first principal surface of said insulative plate, said second conductor layer being separated from said first conductor layer by an insulating space, a third conductor layer provided on a second principal surface of said insulative plate, said third conductor layer being electrically connected through a hole provided in said insulative plate to said second conductor layer, and a fuse element provided on said heat insulative plate in parallel with said first principal surface and electrically connected between said first conductor layer and said second conductor layer such that said fuse element crosses over said insulating space to provide a gap between said fuse element and said first principal surface of said insulative plate, one of said two external leads being attached to said second principal surface of said insulative plate by being connected to said two conductor layer, and the other of said two external leads being connected to the other of said two terminals of said capacitor body.

* * * * *